United States Patent [19]

Sbuelz

[11] 4,340,788

[45] Jul. 20, 1982

[54] METHOD OF AND SYSTEM FOR MEASURING ELECTRICAL CHARACTERISTICS OF CIRCUIT ELEMENTS INCLUDED IN TIME-SHARING TELECOMMUNICATION NETWORK

[75] Inventor: Anes Sbuelz, Milan, Italy

[73] Assignee: Italtel Societa Italiana Telecomunicazioni S.p.A., Milan, Italy

[21] Appl. No.: 234,805

[22] Filed: Feb. 17, 1981

[30] Foreign Application Priority Data

Feb. 18, 1980 [IT] Italy ............................... 19974 A/80

[51] Int. Cl.³ .......................... H04J 3/08; H04B 3/46
[52] U.S. Cl. ............................... 179/175.3 R; 370/17
[58] Field of Search .............. 179/175.3 R, 175.3 A, 179/175.3 F, 175.3 S, 175.2 R, 175.2 C, 175.2 D, 175.21, 175.23, 175.25; 370/85, 114, 13, 14, 15, 16, 17, 51

[56] References Cited

U.S. PATENT DOCUMENTS

| | | | |
|---|---|---|---|
| 3,624,304 | 11/1971 | Formenti et al. | 370/51 |
| 3,986,106 | 10/1976 | Shuck et al. | 179/175.3 R |
| 4,021,625 | 5/1977 | Bradley | 179/175.3 R |
| 4,207,433 | 6/1980 | Bartholomay et al. | 179/175.23 |

*Primary Examiner*—Thomas A. Robinson
*Attorney, Agent, or Firm*—Karl F. Ross

[57] ABSTRACT

To measure electrical characteristics of a line segment, a switch or some other circuit element of a time-sharing telecommunication network using pulse-amplitude modulation, a transmission path is established between two subscriber lines through the circuit element to be tested, these subscriber lines being respectively connected to a generator of a sinusoidal test signal and to a highly sensitive signal detector. The two subscriber lines are briefly closed during a single sampling interval, or during two consecutive sampling intervals separated by an intervening guard interval during which capacitively stored residual energy is dissipated, depending on the nature of the test.

12 Claims, 8 Drawing Figures

METHOD OF AND SYSTEM FOR MEASURING ELECTRICAL CHARACTERISTICS OF CIRCUIT ELEMENTS INCLUDED IN TIME-SHARING TELECOMMUNICATION NETWORK

FIELD OF THE INVENTION

My present invention relates to a method of measuring electrical characteristics of a circuit element forming part of a telecommunication network operating in the time-sharing mode, specifically with pulse-amplitude modulation (PAM), as well as to a system for making such measurements.

BACKGROUND OF THE INVENTION

Commonly owned U.S. Pat. No. 3,624,304 shows a PAM telecommunication system with branched subscriber lines and with line switches that are closable in selected combinations to enable signal transmission between any two subscribers during periodically recurring sampling intervals, two consecutive sampling intervals being separated by a guard interval during which residual energy from previously intercommunicating subscriber lines is dissipated through an impedance matching the characteristic line impedance. For this purpose, a switch (which together with the associated matching impedance will be referred to hereinafter as a zero setter) is closed during the guard interval in order to minimize cross talk due to capacitively stored residual energy. Such cross talk may also be caused by energy electromagnetically stored in the line conductors; in contrast to the aforementioned capacitive energy transfer, which may be termed a transverse component of cross talk, the electromagnetic energy transfer—termed a longitudinal cross-talk component—is not affected by the zero-setting operation but can be minimized by a suitable conductor structure as described, for example, in commonly owned U.S. Pat. Nos. 3,878,485 and 3,973,227.

Transverse and longitudinal cross talk are two kinds of interference that are to be suppressed as much as possible in a well-functioning PAM telephone or other telecommunication network. Other parasitic phenomena impairing communication, such as attenuation and leakage, should also be closely controlled. Line segments, switches and possibly other circuit elements forming part of such a network should therefore be tested from time to time for the detection of faults liable to give rise to inadmissible cross talk or background noise.

OBJECTS OF THE INVENTION

An important object of my present invention, therefore, is to provide a convenient and efficient method of measuring a variety of electrical characteristics of circuit elements installed, permanently or just for trial, in an exchange or some other part of a PAM telecommunication network.

A related object is to provide a simple system for carrying out the method.

SUMMARY OF THE INVENTION

In accordance with my present invention, a transmission path disconnected from any other circuitry of the communication network is established between a first and a second subscriber line of a PAM telecommunication network through a circuit element to be tested. By closure of a first interrupter switch (similar to one of the line switches shown in U.S. Pat. No. 3,624,304) a sinusoidal test signal is supplied during a chosen sampling interval from the first subscriber line via part of this transmission path to the circuit element under test. A second interrupter switch is closed during the same or the immediately following sampling interval, thus at a time separated by not more than a guard interval from the sampling interval chosen for the transmission of the test signal, for temporarily connecting the second subscriber line to the circuit element under test via the remainder of the transmission path while energy received at the second subscriber line is detected and measured.

Advantageously, the two subscriber lines used in such a test have substantially identical characteristic impedances which are significantly different from the average subscriber-line impedance (as seen from the exchange) of the telecommunication network concerned. More particularly, the selected subscriber lines should have a relatively low characteristic impedance for current measurements (e.g. for tests of longitudinal cross talk) and a relatively high characteristic impedance for voltage measurements (e.g. for tests of transverse cross talk).

BRIEF DESCRIPTION OF THE DRAWING

The above and other features of my present invention will now be described in detail with reference to the accompanying drawing in which.

SPECIFIC DESCRIPTION

Figure 1:
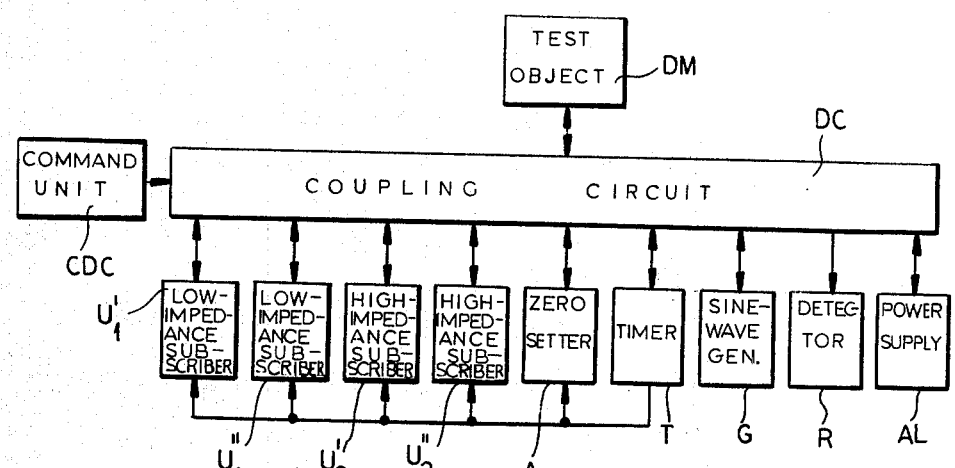
FIG. 1 is an overall block diagram of a system for the measurement of electrical characteristics pursuant to the present improvement.

In FIG. 1 I have shown a test object DM which may be any of several circuit elements described hereinafter with reference to FIGS. 3–8. A coupling circuit DC, controlled by a command unit CDC, serves to establish temporary connections between test object DM and other components, namely a first pair of subscriber lines $U_1'$, $U_1''$ of low characteristic impedance, a second pair of subscriber lines $U_2'$, $U_2''$ of high characteristic impedance, a zero setter A, a timer T serving for the closure and opening of switches in coupling circuit DC, a signal generator G and a highly sensitive signal detector R. Only one subscriber pair $U_1'$, $U_1''$ or $U_2'$, $U_2''$ is used during any given test as will be apparent from the particular description of such tests given hereinafter with reference to FIGS. 3–8.

Figure 2:
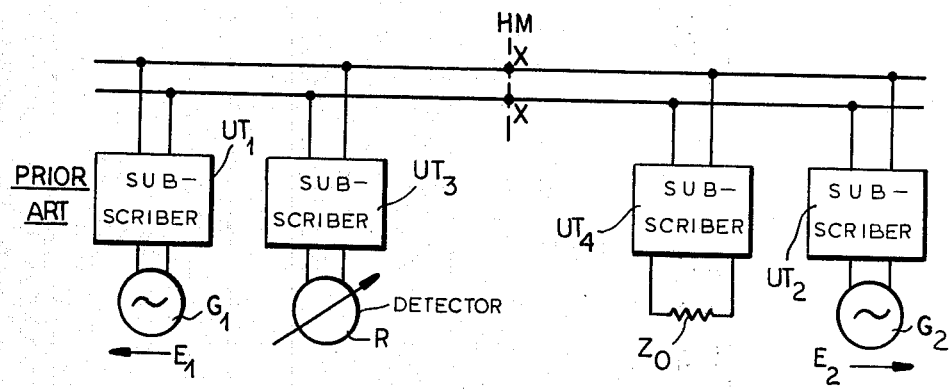
FIG. 2 is a diagram of a conventional measuring circuit.

For a proper appreciation of the present improvement it will be useful to consider a conventional circuit for measuring transverse and longitudinal cross-talk components, as shown in FIG. 2. A common transmission line or speech highway HM has branches (including nonillustrated interrupter switches) constituting four subscriber lines $UT_1$–$UT_4$; lines $UT_1$ and $UT_3$ are disposed on one side and lines $UT_2$ and $UT_4$ are disposed on the other side of a central location X—X where capacitively and inductively stored residual energy is to be measured. Two sine-wave generators $G_1$ and $G_2$ are connected across input ends of subscriber lines $UT_1$ and $UT_2$ remote from common line HM; subscriber line $UT_3$ has an output end remote from line HM connected to a signal detector R whereas subscriber line $UT_4$ is terminated by an impedance $Z_0$ matching its own characteristic impedance. In operation, subscriber lines $UT_1$ and $UT_2$ are connected to line HM during a first sampling interval or phase $\phi_1$; after an intervening guard interval $\phi_0$, during which a nonillustrated zero setter discharges the line at point X—X, subscriber lines $UT_3$ and $UT_4$ are connected to line HM during the immediately following sampling interval or phase $\phi_2$ whereby residual energy can be measured with the aid of detector R. For a test of the longitudinal cross-talk component, generators $G_1$ and $G_2$ are operated in phase opposition (with output voltages $E_1 = -E_2$) whereby the line voltage is zero at point X—X while the line current is twice that emitted by either generator. For the testing of transverse cross talk, on the other hand, the two generators operate in phase so that the line current is zero while the line voltage at point X—X is twice the generator voltage.

Figure 3:
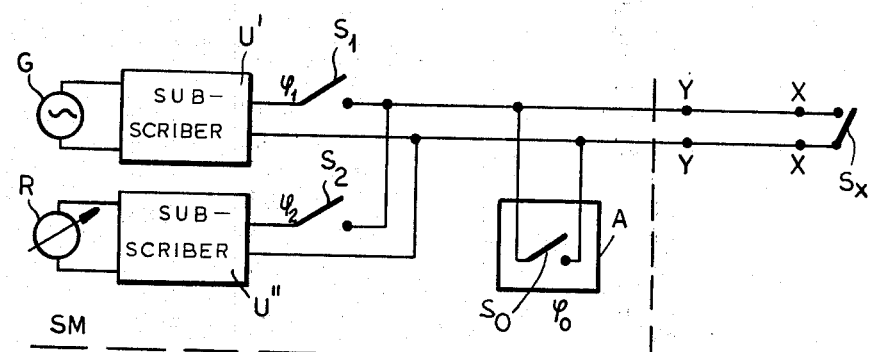
FIG. 3 shows a transmission path adapted to be established by the system of FIG. 1 for the measurement of cross talk in accordance with my invention.

FIG. 3 shows how, in accordance with my present invention, the same measurements can be performed by a simplified circuit SM including only two subscriber lines U' and U" with elimination of one of the two signal generators shown in FIG. 2. The test object DM of FIG. 1 is here represented by a line segment with two pairs of terminals X—X and Y—Y, a switch $S_x$ enabling that line segment to be selectively open-circuited and short-circuited for measuring transverse and longitudinal cross talk, respectively. Sine-wave generator G of FIG. 1 is here shown connected across an input end of line U' while detector R is connected across an output end of line U", these lines being briefly connectable to segment DM via associated electronic interrupter switches $S_1$ and $S_2$ under the control of the timer T shown in FIG. 1. This timer also controls the zero setter A here represented merely by an electronic shunt switch $S_0$ which is connected across the illustrated transmission path in the vicinity of line segment DM; the matching impedance in series with switch $S_0$ has been omitted for simplicity's sake. Even though subscriber lines U' and U" are part of a PAM communication network such as that shown in the above-identified U.S. Pat. No. 3,624,304, circuit SM and test object DM are completely cut off from all other parts of that network including the associated exchange.

Switches $S_1$ and $S_2$ form part of the coupling circuit DC shown in FIG. 1. Power supply AL, not illustrated in FIG. 3, energizes generator G and all other active components.

FIG. 3 also shows, next to each switch $S_1$, $S_2$ and $S_0$, the timing phase or interval during which that switch is closed. Thus, switch $S_1$ closes during a first sampling interval $\phi_1$ to energize the line segment DM with the sine wave emitted by generator G; in the following guard interval $\phi_0$, switch $S_1$ is reopened and switch $S_0$ is closed to dissipate the residual energy as much as possible. In the subsequent sampling interval $\phi_2$, switch $S_0$ is reopened and switch $S_2$ is closed whereby the undissipated residual energy can be read on detector R.

When line segment DM is short-circuited by closure of selector switch $S_x$, subscriber lines U' and U" are preferably those designated $U_1'$ and $U_1''$ in FIG. 1, having a relatively low characteristic impedance which preferably is an aliquot fraction of the average line impedance. Since the transmission path of FIG. 3 is only half as long as the one shown in FIG. 2, the line current is doubled during phase $\phi_1$ if generator G is the equivalent of either generator $G_1$, $G_2$ in FIG. 2; this accounts for an increase in the measuring sensitivity by 6 dB. Since, furthermore, only one subscriber line instead of two is in circuit with test object DM during phase $\phi_2$, the residual current encounters only half the resistance present in the conventional circuit; as a result, sensitivity is increased by another 6 dB. A further increase is due to the choice of subscriber lines $U_1'$ and $U_1''$ having a low characteristic impedance; if that impedance is, say, one-fifth the average line impedance, the additional sensitivity increase amounts to about 13 dB. For the measurement of longitudinal cross talk, therefore, an improvement on the order of 25 dB is realized.

With switch $S_x$ open, subscriber lines $U_2'$ and $U_2''$ of high characteristic impedance—preferably an integral multiple of the average line impedance—should be used for components U' and U" shown in FIG. 3. The basic improvement for the measurement of transverse cross talk is again 12 dB, as in the preceding instance, as the voltage across terminals X—X is doubled in both phases $\phi_1$ and $\phi_2$. An additional improvement of 6 dB is achievable when the line impedance has twice the normal value so that a further doubling of the line voltage across terminals X—X takes place.

Figure 4:
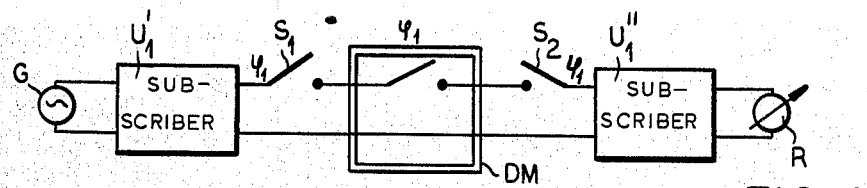
FIGS. 4–8 show other transmission paths which can be established by the system of FIG. 1 for measuring different electrical characteristics.

FIG. 4 shows a transmission path established for the testing of the attenuation introduced by a series switch here representing the test object DM. Since this involves the measurement of line current by detector R, low-impedance subscriber lines $U_1'$ and $U_1''$ are used as in the aforedescribed test for longitudinal cross talk. In this instance, however, all three switches $S_1$, $S_2$ and DM are closed in the same phase or sampling interval $\phi_1$.

Figure 5:
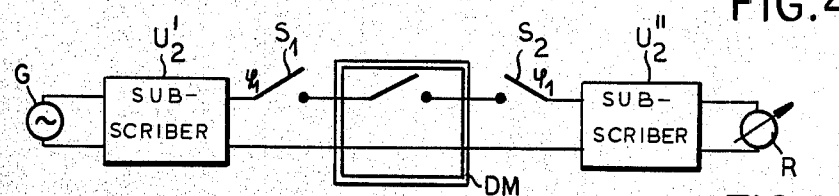

FIG. 5 shows the use of the circuit arrangement of FIG. 4 for the testing of current leakage when switch DM is open. Since, however, this requires the measuring of a voltage, the subscriber lines used are here the high-impedance components $U_2'$ and $U_2''$. The operation of the test circuit of FIG. 5 differs from that of the circuit of FIG. 4 only in that switch DM is open when switches $S_1$ and $S_2$ are closed by the timer in phase $\phi_1$.

Figure 6:
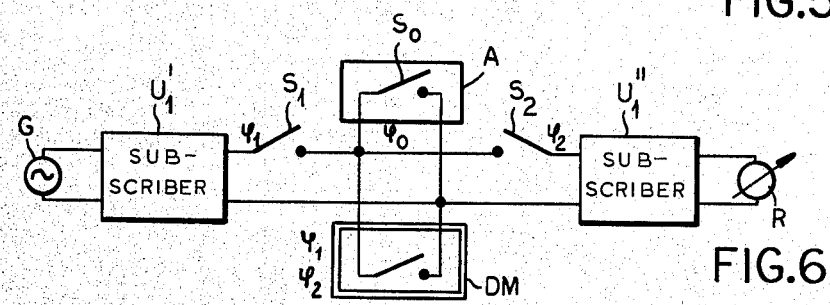
Figure 7:
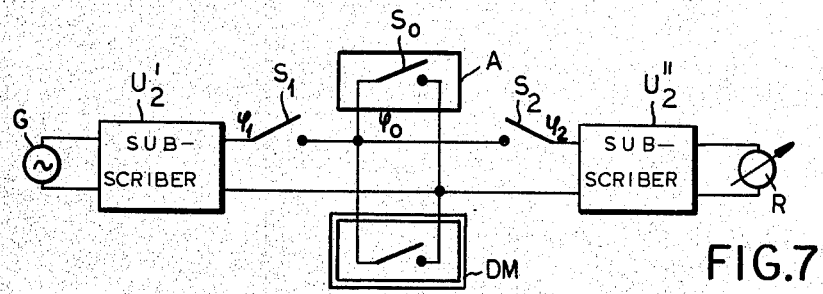

FIGS. 6 and 7 illustrate the testing of a shunt switch, connected across the line in parallel with zero setter A, for its contribution to longitudinal and transverse cross talk, respectively. In the first instance (FIG. 6) the low-impedance subscriber lines $U_1'$ and $U_1''$ are utilized, with closure of switch $S_1$ in phase $\phi_1$ and of switch $S_2$ in phase $\phi_2$; test switch DM is closed in both phases while zero setter A operates, as usual, only in the intervening guard interval $\phi_0$. In the second instance (FIG. 7) the high-impedance subscriber lines $U_2'$ and $U_2''$ are employed; switches $S_1$, $S_0$ and $S_2$ again close successively during phases $\phi_1$, $\phi_0$ and $\phi_2$ whereas test switch DM is permanently open.

Figure 8:
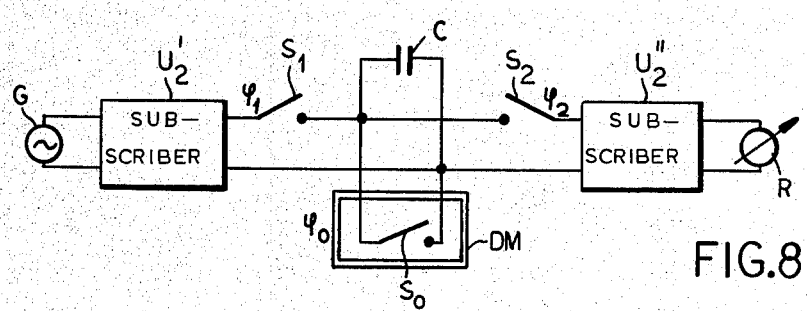

In FIG. 8, finally, I have illustrated the possibility of using the zero setter itself (switch $S_0$ in series with the nonillustrated matching impedance) as the test object DM. In order to improve the sensitivity of the system to transverse cross talk, i.e. to capacitively stored residual energy remaining after the closure of switch $S_0$, a cross-talk-enhancing capacitor C is connected across the line in parallel with the zero setter; this connection should have lowest possible inductivity. Again, as in previous instances in which the electrical characteristic to be measured is a voltage, high-impedance subscriber lines $U_2'$ and $U_2''$ are used. Switches $S_1$, $S_0$ and $S_2$ operate in their normal sequence, being closed in phases $\phi_1$, $\phi_0$ and $\phi_2$, respectively.

I claim:

1. A method of measuring electrical characteristics of a circuit element forming part of a telecommunication network with branched subscriber lines and with interrupter switches closable in selected combinations for enabling signal transmission between subscribers during sampling intervals separated by guard intervals during which residual energy from previously intercommunicating subscriber lines is dissipated, comprising the steps of:

(a) establishing a transmission path disconnected from any other network circuitry between a first and a second subscriber line through a circuit element to be tested;

(b) supplying a sinusoidal test signal by closure of a first interrupter switch from said first subscriber line via part of said transmission path to said circuit element during a chosen sampling interval;

(c) temporarily connecting said second subscriber line by closure of a second interrupter switch to said circuit element via the remainder of said transmission path at a time separated by not more than a guard interval from said chosen sampling interval; and (d) detecting and measuring energy received in step (c) at said second subscriber line.

2. A method as defined in claim 1 wherein steps (a) through (d) are performed with subscriber lines of relatively high characteristic impedance for voltage measurements and with subscriber lines of relatively low characteristic impedance for current measurements.

3. A method as defined in claim 1 or 2 wherein said circuit element is a series switch, step (c) being performed simultaneously with step (b) during said chosen sampling interval.

4. A method as defined in claim 1 or 2 wherein said circuit element is a shunt switch, step (c) being performed in a sampling interval immediately following said chosen sampling interval.

5. A method as defined in claim 4 wherein said shunt switch is closed in a guard interval intervening between steps (b) and (c), comprising the further step of connecting a cross-talk-enhancing capacitance in parallel with said shunt switch.

6. A method as defined in claim 1 or 2 wherein said circuit element is a line segment which is short-circuited for current measurements and open-circuited for voltage measurements.

7. A system for measuring electrical characteristics of a circuit element forming part of a telecommunication network with branched subscriber lines and with interrupter switches closable in selected combinations for enabling signal transmission between subscribers during sampling intervals separated by guard intervals during which residual energy from previously intercommunicating subscriber lines is dissipated, comprising:

a generator of a sinusoidal test signal connected to an input end of a first subscriber line;

a highly sensitive signal detector connected to an output end of a second subscriber line;

a first interrupter switch closable to connect an output end of said first subscriber line to a circuit element to be tested;

a second interrupter switch closable to connect an input end of said second subscriber line to said circuit element; and timing means for establishing a transmission path disconnected from any other network circuitry between said first and second subscriber lines through said circuit element by closing said first interrupter switch during a chosen sampling interval and temporarily closing said second interrupter switch at a time separated by not more than a guard interval from said chosen sampling interval.

8. A system as defined in claim 7 wherein said circuit element is a line segment with input terminals connected in parallel to said first and second interrupter switches, further comprising another switch connected to a pair of output terminals of said line segment for selectively open-circuiting and short-circuiting same.

9. A system as defined in claim 7 wherein said circuit element is a shunt switch connected across said transmission path between said first and second subscriber lines, said first and second interrupter switches being controlled by said timing means for closure during consecutive sampling intervals separated by a guard interval.

10. A system as defined in claim 9 wherein said shunt switch is controlled by said timing means for closure during the guard interval intervening between closures of said first and second interrupter switches, further comprising a cross-talk-enhancing capacitor connected in parallel with said shunt switch.

11. A system as defined in claim 7 wherein said circuit element is a series switch inserted in said transmission path between said first and second subscriber lines, said first and second interrupter switches being controlled by said timing means for simultaneous closure during said chosen sampling interval.

12. A system as defined in claim 7, 8, 9, 10 or 11 wherein said first and second subscriber lines have substantially identical characteristic impedances significantly different from the average subscriber-line impedance of the telecommunication network.

* * * * *